United States Patent [19]
Sprowl

[11] 3,809,875
[45] May 7, 1974

[54] FAST RESPONDING ALTERNATING CURRENT VOLTMETER HAVING AN OUTPUT THAT IS LINEAR IN DECIBELS

[76] Inventor: James A. Sprowl, 141 Greenbay Rd., Wilmette, Ill. 60091

[22] Filed: July 3, 1972

[21] Appl. No.: 268,535

Related U.S. Application Data

[62] Division of Ser. No. 34,772, May 5, 1970, Pat. No. 3,676,661.

[52] U.S. Cl. .............................. 235/197, 328/145
[51] Int. Cl. ............................................... G06g 7/24
[58] Field of Search ................ 235/197, 183; 320/1; 307/246, 293, 294, 229; 328/145, 129; 340/347 AD; 324/132

[56] References Cited
UNITED STATES PATENTS

| | | | |
|---|---|---|---|
| 3,414,898 | 12/1968 | Barton | 340/347 AD |
| 3,207,926 | 9/1965 | Schmader | 328/129 X |
| 3,314,062 | 4/1967 | Pommerening | 320/1 X |
| 3,348,216 | 10/1967 | Vinson | 320/1 X |
| 3,440,414 | 4/1969 | Miller | 328/145 X |

*Primary Examiner*—Joseph F. Ruggiero
*Attorney, Agent, or Firm*—Mason, Kolehmainen, Rathburn & Wyss

[57] ABSTRACT

A series of variable gain amplifiers connect an alternating current signal input to a rectifier and log conversion circuit. The rectifier portion of the circuit charges one capacitor to a level which corresponds to the signal positive peak level and charges another capacitor to a level which corresponds to the signal negative peak level. The log conversion portion periodically interconnects the capacitors and a resistor into a loop circuit and measures the time it takes for current flow through the resistor to decay down to a predetermined reference level. This time measurement is proportional to the logarithm of the peak-to-peak signal level and may therefore be displayed on a meter or other suitable output display device that is linearly calibrated in decibels. The gain of the variable gain amplifiers is varied as is necessary to handle varying input signal magnitudes, and the meter reading is corrected to compensate for such changes in gain. The resulting voltmeter may be designed to have a flat frequency response down to 20 cycles per second and may still accurately depict rapid changes in signal amplitude, such as the fluctuations of a human speech signal waveform.

11 Claims, 2 Drawing Figures

FIG.1
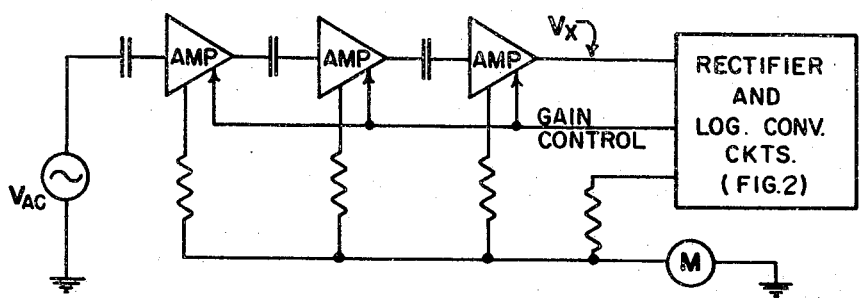
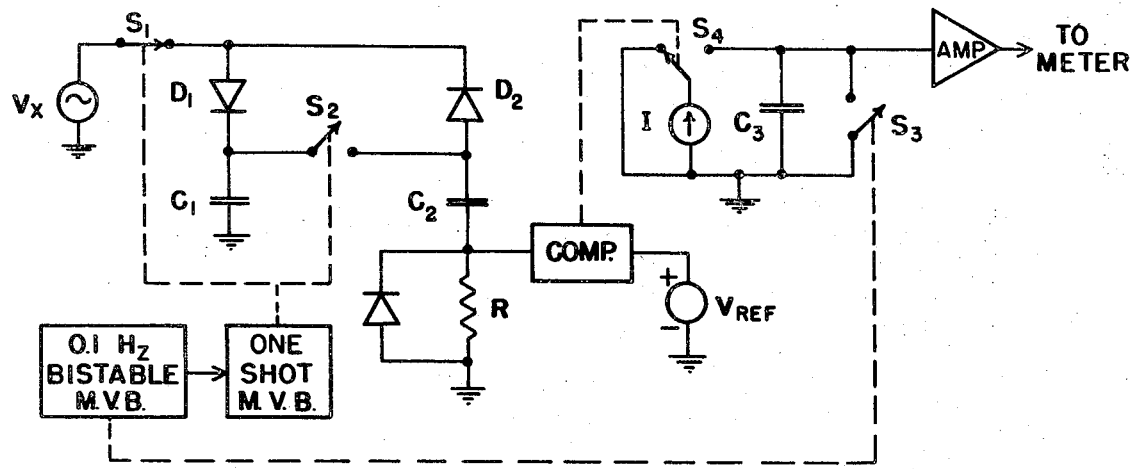
FIG.2

FAST RESPONDING ALTERNATING CURRENT VOLTMETER HAVING AN OUTPUT THAT IS LINEAR IN DECIBELS

CROSS REFERENCE TO RELATED APPLICATION

This application is a division of application Ser. No. 34,772 filed on May 5, 1970 by the present applicant, now U.S. Pat. No. 3,676,661 which issued on July 11, 1972. All of U.S. Pat. No. 3,676,661 is hereby incorporated by reference into the present application as essential matter. Of particular interest to the present invention are those portions of U.S. Pat. No. 3,676,661 which relate to FIGS. 1 through 7 of the patent.

BACKGROUND OF THE INVENTION

The present invention relates to alternating current voltmeters, and more particularly to voltmeters having an output which may be calibrated linearly in decibels, rather than in volts. Another facet of the invention relates to voltmeters having quick response characteristic.

In the field of audio engineering, signal levels and sound levels are commonly measured in decibels rather than in volts. Measurements are typically carried out with conventional linear voltmeters having scales which are nonlinearly calibrated in decibels. In broadcasts and recording studios, for example, the so-called "VU" meters are commonly used. These meters are basically signal averaging voltmeters having scales that are calibrated non-linearly from about +6 decibels down to −30 decibels. Due to the nonlinearity of the decibel scale, these voltmeters are able to represent signal levels accurately only over a range of about 10 or 15 decibels. Between 15 and 30 decibels, the typical VU meter scale becomes so compressed that the scale is virtually impossible to read accurately. signal levels below 30 decibels may not normally be suitably displayed on a conventional VU meter without the use of manual range switching circuits. There is a need for a VU-type device having a scale which is calibrated linearly in decibels over at least a 30 decibel range.

A number of voltmeters are available which have scales that are linearly calibrated in decibels. These voltmeters generally achieve a linear scale through the use of diodes and other nonlinear devices which force a logarithmic characteristic upon a linear voltmeter movement. Typically, these meters cover a decibel range of not more than 20 decibels—a voltage range of only 10 to 1. Range switching circuits are required to give a wider range of signal level display. The nonlinear circuits used in such voltmeters often may include complex adjustment circuits having many linearity adjustment potentiometers. Often the nonlinear elements in such a circuit are temperature sensitive and require careful temperature stabilization. There is a need for a much simpler, temperature stable form of logarithmic conversion circuit for use in such voltmeters. There is also a need for voltmeters of this type having scales which cover more than a 20 decibel range.

More sophisticated digital voltmeters are now on the market having numeric readout displays. These voltmeters typically contain complex circuits such as analog-to-digital converters, digital data processing circuits, decoders, and the like. The expense of such circuits has placed them out of the reach of those wishing to have a low cost meter for use in broadcast signal monitoring and the like.

Signal monitoring is typically critical in broadcasting and in professional recording. In recording and in broadcasting, there are typically maximum signal levels which must not be exceeded if distortion is to be avoided. Unlike other voltmeter applications in which the average or power level of a signal is most significant, it is usually more important for a broadcast and recording engineer to know the peak level of a signal so as to know whether a particular signal may be passed on to a recording device or a transmitter without distortion. VU meters are conventionally used for this purpose, even though they do not respond to momentary signal peaks and transients.

"Peak-to-peak" and "peak-to-valley" voltmeters may be used to accurately measure signal peak levels. Such peak-reading meters typically are designed so as to accurately measure any signal level down to the lowest frequency signal which is to be measured, for example, 20 Hz. When so designed, the time constant of such a meter is typically so long that the meter movement takes a substantial period of time (for example, several seconds) to return to a low reading after having once been pushed up to a high reading by a peak signal excursion. This excessive time constant renders most peak-reading meters unsuitable for broadcast and recording studio use. VU-type meters are designed to have a built-in compromise between low frequency measurement accuracy and meter response time constant and may not be used to accurately measure signal levels below 100 to 200 Hz. Thus, no reasonably inexpensive metering system is known which may accurately measure signal levels down to 20 Hz. and which may also respond within a few tenths of a second to sudden changes in signal level.

SUMMARY OF THE INVENTION

A primary object of the present invention is to overcome those shortcomings of prior art devices which have just been pointed out.

In brief, the present invention comprises a peak detecting alternating current voltmeter having a logarithmic response characteristic which is suitable for accepting an alternating current input and for representing the peak-to-peak magnitude of that signal on a scale that is linearly calibrated in decibels over an extended range. The preferred embodiment of the invention is able to accurately measure signal levels down to 20 Hz., and yet is able to accurately display drops in signal levels of as much as 30 decibels within one tenth of a second. The voltmeter is capable of recording brief peak transients which endure for only microseconds. The voltmeter is thus able to accurately represent the wave shape of fluctuating audio speech signals and the like.

Briefly stated, the invention includes a peak detecting rectifier circuit which detects the peak fluctuations of an audio signal and which records the magnitude of these fluctuations in a capacitive storage means. Periodically, the capacitive storage means is discharged through a resistive element. Typically, this discharge procedure is carried out every tenth of a second. The time constant of the resistive element and the capacitive storage means is chosen so that this discharge takes only a brief interval of time, say, one millisecond. A time measurement circuit measures the time it takes the resistive element to discharge the capacitive storage means down to a predetermined reference level. In the preferred embodiment of the invention, the time measurement circuit comprises a current source that is arranged to charge a capacitor during the measured time interval so that the capacitor charge represents the duration of the interval. The potential developed across the capacitor may then be applied to a conventional meter movement through a suitable buffer amplifier. Log conversion is inherent in this measurement process.

After each periodic measurement, the rectifier means recharges the capacitive storage means up to the peak level of the audio signal during the next tenth-of-a-second measurement interval which follows. In this manner, a conventional meter is enabled to display the peak levels which are reached by an audio signal during each individual tenth-of-a-second time interval, with a new measurement occurring every tenth of a second. The resultant meter indication is able to measure signal amplitudes accurately down to 20 Hz., since the full excursion of a 20 cycle signal may be recorded in a tenth of a second interval. Since the capacitive storage means is fully discharged every tenth of a second, the value of each new measurement is not prejudiced or influenced by any previous measurements which have been made. Hence, the meter does not have a well-defined time constant as do most conventional meters, but is able to accurately measure signal levels during each tenth-of-a-second interval.

The meter scale is calibrated linearly in decibels. The basic range of the detector and log conversion circuit in the preferred embodiment of the invention is 30 decibels, although this range may be extended by a suitable choice of circuit components. In the preferred embodiment of the invention, the range over which signals may be measured is extended to 80 decibels by means of variable gain amplifiers which couple an input signal to the detector and log conversion circuits. Gain control means are provided which automatically adjust the gain of these amplifiers to keep the signal levels applied to the detector within a 30-decibel range.

Since the measuring circuit output is linear in decibels, and since a change in amplifier gain setting corresponds to adding or subtracting a fixed number of decibels to the system gain, it is possible to compensate for a change in amplifier gain by simply adding or subtracting a DC signal level to the signal which is supplied to the display meter. The DC level is chosen to be proportional to the gain change in decibels. In this way, the gain settings of the amplifiers may be changed at any time without altering the reading presented by the meter.

Further objects and advantages of the invention are apparent in the detailed description which follows, and the points of novelty which characterize the invention are pointed out in the claims annexed to and forming a part of the present specification.

BRIEF DESCRIPTION OF THE FIGURES

FIG. 1 is a block diagram of an audio peak reading decibelmeter which includes a rectifier and log conversion circuit designed in accordance with the present invention.

FIG. 2 is a schematic diagram of the rectifier and log conversion portions of the decibelmeter shown in FIG. 1.

DETAILED DESCRIPTION OF THE PREFERRED EMBODIMENT

A detailed description of the invention may be found in patent application No. 3,676,661 which issued on July 11, 1972 to the present applicant. Of particular interest to the present invention are the portions of the detailed description in application No. 3,676,661 which relate to FIGS. 1 through 7. FIGS. 1 and 2 of this specification correspond to FIGS. 6 and 7 in U.S. Pat. No. 3,676,661.

While there has been described a preferred embodiment of the present invention, it will be understood that numerous modifications and changes will occur to those skilled in the art. The appended claims are intended to cover all such modifications and changes as come within the true spirit and scope of the invention.

What is claimed as new and desired to be secured by Letters Patent of the United States is:

1. A detection circuit for a time-varying signal having a logarithmic input-output characteristic, comprising:

capacitive means for storing charge;
detection means for detecting said time-varying signal and for developing a charge across said capacitive means proportional to the detected amplitude of said time-varying signal;
a resistive element;
means for periodically connecting said resistive element across said capacitive means; and
means for measuring the time it takes the current flow through said resistive element to decay down to a predetermined reference level following each connection of said resistive element across said capacitive means;
whereby the measured time is proportional to the logarithm of the detected amplitude of said time-varying signal.

2. A detection circuit in accordance with claim 1 wherein said detection means includes means for detecting maximum fluctuations of said time-varying signal and means for charging said capacitive means to a potential level which corresponds to said maximum detected fluctuations.

3. A detection circuit in accordance with claim 1 wherein said capacitive means includes at least one capacitor having first and second terminals, and wherein said detection means includes at least one rectifier connecting the first terminal of each of said capacitors to the fluctuating signal and means for holding the second terminal of said capacitors at fixed potential levels.

4. A detection circuit for a time-varying signal having a logarithmic input-output characteristic, comprising:

capacitive means for storing charge comprising first and second capacitors;
detection means for detecting said time-varying signal including a first detection means for charging said first capacitor in response to fluctuations of said signal in a first direction and second detection means for charging said second capacitor in response to fluctuations of said signal in a second, opposite direction, whereby said detection means develops a charge across said capacitor means proportional to the detected amplitude of said time-varying signals;

a resistive element;

means for periodically connecting said resistive element across said capacitive means including means for connecting said first and second capacitors and said resistive element together in a loop configuration with said capacitors oriented with respect to one another in said loop so that the potentials developed across said capacitors by said detection means are added to one another and are applied jointly to said resistive element; and means for measuring the time it takes the current flow through said resistive element to decay down to a predetermined reference level following each connection of said resistive element across said capacitive means;

whereby the measured time is proportional to the logarithm of the detected amplitude of said time-varying signal.

5. A detection circuit in accordance with claim 4 wherein said first and second capacitors each have first and second terminals; wherein said detection means includes at least one rectifier connecting a first terminal of each of said capacitors to the fluctuating signal, said rectifier connected to said first capacitor having a reverse orientation from said rectifier connected to said second capacitor; and wherein said detection means also includes means for holding the second terminal of said capacitors at fixed reference potentials.

6. A detection circuit in accordance with claim 5 wherein the means for periodically connecting includes switch means for disconnecting said rectifiers from said fluctuating signal when said resistive element is connected across said capacitive means.

7. A detection circuit in accordance with claim 5 wherein said resistive element connects the second terminal of said second capacitor to a fixed reference potential, wherein the second terminal of said first capacitor connects to a fixed reference potential, wherein said means for periodically connecting includes first switching means for periodically connecting together the first terminals of said first and second capacitors, second switching means for periodically disconnecting said rectifiers from said fluctuating signal, and means for periodically defeating the means for holding the second terminal of said first capacitor at a fixed reference potential.

8. A detection circuit in accordance with claim 5 wherein the means for holding the second terminal of said first capacitor at a fixed reference potential comprises a diode connecting said second terminal to a fixed reference potential, oriented to conduct a charging current when said second capacitor is charged by current flow through one of said rectifiers, and oriented not to conduct when said second capacitor is discharged through said resistive element by said means for periodically connecting, whereby said diode also functions as said means for periodically defeating.

9. A detection circuit in accordance with claim 1 wherein said means for measuring comprises comparing means connecting connected to said resistive element for comparing the potential across said element to a fixed reference potential and for generating an output signal which is present whenever the potential across said element exceeds the reference potential, and time measurement means connecting to said output signal for measuring its duration.

10. A detection circuit in accordance with claim 9 wherein said time measurement means comprises a constant current source, a capacitor, switching means for connecting said current source to said capacitor when said output signal is present, and discharge means for periodically discharging said capacitor.

11. A detection circuit for a time-varying signal having a logarithmic input-output characteristic comprising:

capacitive means for storing charge;

detection means for detecting said time-varying signal and for developing a charge across said capacitive means proportional to the detected amplitude of said time-varying signal;

variable-gain alternating-current amplifier means interposed between said time-varying signal and said detection means;

a resistive element;

means for periodically connecting said resistive elements across said capacitive means;

means for measuring the time it takes the current flow through said resistive element to decay down to a predetermined reference level following each connection of said resistive element across said capacitive means;

automatic amplifier gain changing means for adjusting the gain of said variable-gain amplifier means to keep the level of signal reaching said detection means within a desired signal magnitude range;

means responsive to changes in gain for generating at least one correction signal proportional to the amount of gain change as measured in decibels; and means for adjusting the time measurement value by adding to said value a value proportional to said correction signal so as to provide the same resultant time measurement value regardless of the particular amplifier gain setting;

whereby the measured time is proportional to the logarithm of the detected amplitude of said time-varying signal.

* * * * *